United States Patent [19]

Mall et al.

[11] Patent Number: 5,413,728
[45] Date of Patent: May 9, 1995

[54] PROCESS FOR OPERATING A COMPRESSOR HEAT PUMP OR A COMPRESSOR REFRIGERATION SYSTEM IN WHICH AMMONIA IS USED AS THE REFRIGERANT

[75] Inventors: Klaus Mall, Wesseling; Siegfried Kussi, Wermelskirchen, both of Germany

[73] Assignee: Rhein Chemie Rheinau GmbH, Manheim, Germany

[21] Appl. No.: 111,858

[22] Filed: Aug. 26, 1993

[30] Foreign Application Priority Data

Sep. 3, 1992 [DE] Germany ............... 42 29 364.2
Dec. 3, 1992 [DE] Germany ............... 42 40 733.8

[51] Int. Cl.$^6$ .................. C09K 5/02; C10M 133/00
[52] U.S. Cl. ........................... 252/68; 252/52 A
[58] Field of Search .................... 252/68, 52 A

[56] References Cited

U.S. PATENT DOCUMENTS

| | | | |
|---|---|---|---|
| 4,111,821 | 9/1978 | Lazarus | 252/499 |
| 4,248,726 | 2/1981 | Uchimuma et al. | 252/52 A |
| 4,267,064 | 5/1981 | Susaki et al. | 252/52 A |
| 4,948,525 | 8/1990 | Sasaki et al. | 252/52 A |
| 4,963,280 | 10/1990 | Wilkins et al. | 252/58 |
| 5,279,752 | 1/1994 | Hasegawa | 252/68 |

FOREIGN PATENT DOCUMENTS

| | | |
|---|---|---|
| 0227477 | 7/1987 | European Pat. Off. |
| 0336171 | 10/1989 | European Pat. Off. |
| 0490810 | 6/1992 | European Pat. Off. |
| 0533165 | 3/1993 | European Pat. Off. |
| 2806133 | 8/1979 | Germany |

OTHER PUBLICATIONS

Lubnicant additives, Smalheen & Smith; The Lezius-Miles Co. Cleveland, Ohio, 1967.
Derwent Abstract of J61255977 (Nov. 13, 1986).
Orbit Abstract of EP-A 0 490 810 (Jun. 17, 1992).
Orbit Abstract of DE-A-28 06 133 (Aug. 16, 1979).

*Primary Examiner*—Prince Willis, Jr.
*Assistant Examiner*—James M. Silbermann
*Attorney, Agent, or Firm*—Connolly & Hutz

[57] ABSTRACT

A process for operating a compressor heat pump or a compressor refrigeration system using ammonia as the refrigerant and a refrigerant compressor lubricated with a lubricant from the polyalkylene glycol family, The polyalkylene glycols used as lubricants have a specific composition and an amine is added thereto. Monofunctional or difunctional polyalkylene glycols are used as lubricants.

7 Claims, No Drawings

PROCESS FOR OPERATING A COMPRESSOR HEAT PUMP OR A COMPRESSOR REFRIGERATION SYSTEM IN WHICH AMMONIA IS USED AS THE REFRIGERANT

The invention relates to a process for operating a compressor heat pump or a compressor refrigeration system using ammonia as the refrigerant and a refrigerant compressor lubricated with a lubricant from the polyalkylene glycol family.

Refrigeration systems in which ammonia is used as the refrigerant are usually in the form of closed refrigeration loops. The refrigeration loop consists of a refrigerant compressor, in which either volumetrically transporting compressors or centrifugal compressors are used, a condenser and an evaporator. The vaporised refrigerant is removed by suction from the evaporator via the refrigerant compressor, compressed and transferred to the condenser from which it enters the evaporator via an expansion valve. Mineral oils and synthetic oils based on hydrocarbons are currently mainly used as lubricants. They are however virtually insoluble in $NH_3$ and have high viscosity values at low temperatures. In order to remove these oils from the refrigeration loop it is necessary to interrupt the process. Such interruptions are unavoidable since the oil leaves the refrigerant compressor together with the ammonia and automatically enters the refrigeration loop. As a result the oil is deposited on the surfaces of the loop in the form of a film and thus impairs the transfer of heat into the heat exchangers, interferes with the operation of the valves and control devices and is finally deposited in the evaporator in the form of a sump.

EP-A 0 490 810 discloses a process for operating an ammonia refrigeration system or an ammonia heat pump comprising a condenser, an expansion device, an evaporator and a refrigerant compressor which transports and compresses $NH_3$. In this process the lubricant introduced into the refrigerant compressor containing a lubricating device is a liquid compound from the polyalkylene glycol family. The quantities of lubricant added to the transporting stream of the refrigerant in the refrigerant compressor are entrained with the transporting stream. The evaporator liquid is branched off in a branch stream, the lubricant being concentrated in liquid form by a lubricant-purging device and a separator and being introduced into the lubricating device, while the evaporated portion of the branch stream is recycled into the main transporting stream.

In the case of EP-A 0 490 810 the polyalkylene glycols employed preferably consist of ethylene and propylene copolymers which are present in an ethylene/propylene ratio of 4:1.

The temperatures occurring at the pressure valves of piston compressors are however so high, i.e. about 180° C., that the highly reactive polyalkylene glycols are not necessarily capable of withstanding the effects thereof.

The object of the present invention is to provide a process for operating a compressor heat pump or a compressor refrigeration system using ammonia as the refrigerant, in which the lubricant employed for the lubricated refrigerant compressor withstands the high temperatures at the pressure valve of the piston compressor.

This is achieved according to the invention by a process in which the polyalkylene glycols used as lubricants have a specific composition and an amine is added to the lubricant.

By adding an amine to the lubricant consisting of polyalkylene glycols of a specific composition it is possible to prevent the decomposition of the polyalkylene glycols under the effects of depolymerisation. The amines added act as radical traps.

Also, by adding an amine the decomposition of the polyalkylene glycols is effectively prevented at the high end temperatures occurring at the pressure valves of oil-lubricated $NH_3$ compressors.

Care must of course also be taken to ensure that the amine added to the polyalkylene glycol/$NH_3$ mixture remains soluble over the entire temperature range prevailing in the $NH_3$ refrigeration system or $NH_3$ heat pump. Thus no salt formation must occur, nor any other undesired chemical reactions such as for example flocculation, etc. Such negative effects must be avoided since they would result in operational disruptions and damage, such as for example blockages in the control devices.

Suitable lubricants according to the invention are monofunctional polyalkylene glycols. Compared with di- and higher-functional polyalkylene glycols, monofunctional polyalkylene glycols have the advantage of greater thermal stability. The main reason why they are suitable for the present field of application is that their tendency to release free radicals at the high temperatures occurring at the pressure valves of piston compressors—which free radicals then produce undesired side reactions—is minimal.

The recommended alternative to the use of monofunctional polyalkylene glycols as lubricants is the use of difunctional polyalkylene glycols. Although the latter are thermally not as stable as the monofunctional polyalkylene glycols, they do have the advantage of considerably higher solubility in ammonia.

Suitable polyalkylene glycols for the purposes of the invention are not only polyethylene glycols but also polypropylene glycols, as well as mixtures thereof and copolymers thereof having a molecular weight in the range from 200–4500. Although polyethylene glycols have higher pour points than polypropylene glycols, they are highly soluble in ammonia, so that no deposits are formed in the refrigeration loop. Polypropylene glycols on the other hand have low pour points in the range from −40° to −50° C. This advantageous property is also retained in blends and copolymers with polyethylene glycols in ratios of up to about 1:1. Finally, depending on requirements, blends and copolymers of polyethylene glycols and polypropylene glycols in ratios of 2:1 to 1:2 provide an optimum balance with regard to pour point and solubility in ammonia.

Further means of varying the lubricant according to the invention are provided by the abovementioned effects of functionality. The lower the number of functional hydroxyl groups in the molecule, the greater is its thermal stability. Conversely, the solubility of polyalkylene glycols increases, the greater their number of hydroxyl groups.

On the whole it has proven appropriate to use polypropylene glycols preferably in their difunctional form, optionally mixed with mono- or difunctional polyethylene glycols.

Regardless of whether (mono- or difunctional) polyalkylene glycols are used as lubricants, a diphenylamine, a diphenylamine derivative, a phenylenediamine or a phenylenediamine derivative is used as the amine according to the invention.

The addition of an amine according to the invention produces an increase in the solubility of even slightly less soluble polyalkylene glycols, and it is thus possible according to the invention to use such polyalkylene glycols, which are advantageous due to their predominantly low pour point, for lubricating refrigerant compressors in $NH_3$ refrigeration systems.

In comparison tests of polyalkylene glycols with and without the addition of diphenylamine, diphenylamine derivatives, phenylenediamine or phenylenediamine derivatives it was found that the polyalkylene glycols together with the additives according to the invention display increased thermal resistance and thus have a longer lifetime.

According to the invention a disubstituted diphenylamine is preferably added to the lubricant. 4,4'-Di(2-phenylethyl)diphenylamine has proven to be particularly effective. Alternatively, an N,N'-disubstituted phenylenediamine can be added to the lubricant; N,N'-di-sec.-butyl-p-phenylenediamine has been found to be particularly effective.

The diphenylamine, diphenylamine derivative, phenylene diamine or phenylenediamine derivative is added to the lubricant in a quantity of 0.1 to 5, and preferably 1% by weight, based on the lubricant.

The particular advantage of selecting difunctional polypropylene glycols as lubricants has been found to be the fact that these compounds display a certain degree of solubility for mineral oils and synthetic hydrocarbon oils. This advantage is particularly beneficial in cases where polyalkylene glycols are used in refrigeration systems which have been previously lubricated with mineral oils or synthetic hydrocarbon oils. With the aid of suitable solvents it is of course possible to wash refrigeration systems completely free of oil so that the solubility of mineral oils or synthetic hydrocarbon oils in the lubricant subsequently employed is irrelevant. Experience has however revealed that this process is extremely laborious and the removal of the solvent employed is costly. When benzine or toluene are used as solvents there is the additional risk of fire on account of their high flammability. In such cases the use of difunctional polypropylene glycols allows the system to be operated unproblematically from the beginning even where residues of mineral oils or synthetic hydrocarbon oils are present in the refrigeration loop.

Suitable lubricants according to the invention must have specific physical properties. They should have relative molecular weights of between 200 and 4500, a kinematic viscosity at 40° C. of between 20 and 450 $mm^2/s$ and a pour point of between −35° and −50° C. The physical data of two polyalkylene glycols having different degrees of polymerisation and an ethylene oxide/propylene oxide ratio of 1:1 (PAG-EP 1:1) together with an added quantity of an amine derivative of 1% by weight are mentioned below as examples:

|  | PAG-EP 1:1 | |
| --- | --- | --- |
|  | (1) | (2) |
| Molecular weight | about 1200 | about 2500 |
| Viscosity ($mm^2/s$) at 40° C. | about 70 | about 220 |
| Pour point | −50° C. | −45° C. |
| Density ($g/cm^3$) at 20° C. | 1.038 | 1.046 |

PAG-EP 1:1 (1) is particularly suitable for piston compressors and PAG-EP 1:1 (2) for screw compressors which require a lubricating oil of a viscosity grade of between ISO VG 100 and ISO VG 460.

We claim:

1. A process for operating a compressor heat pump or a compressor refrigeration system using ammonia as the refrigerant and a refrigerant compressor which is lubricated with a lubricant that consists of a substance selected from the group consisting of copolymeric alkylene glycols or mixtures of polyalkylene glycols having in each case ethylene oxide/propylene oxide ratios of about 1:1, wherein an additive is added to said lubricant, said additive consisting of an amine selected from the group consisting of 4,4'-di(2-phenylethyl)diphenylamine and N,N'-di-sec.-butyl-p-phenylenediamine and further wherein the amine is added to the lubricant in a quantity of 0.1 to 1% by weight, based on the lubricant.

2. A process according to claim 1, wherein the lubricant has a molecular weight of between 200 and 4500.

3. A process according to claim 1, wherein the lubricant has a kinematic viscosity at 40° C. of between 20 and 450 $mm^2/s$.

4. A process according to claim 1, wherein the lubricant has a pour point of between −35° and −50° C.

5. A process according to claim 1, wherein the lubricant has a molecular weight of between 200 and 4500 and a kinematic viscosity at 40° C. of between 20 and 450 $mm^2/s$.

6. A process according to claim 1, wherein the lubricant has a molecular weight of between 200 and 4500 and a pour point of between −35° and −50° C.

7. A process according to claim 1, wherein the lubricant has a molecular weight of between 200 and 4500, a pour point of between −35° and −50° C. and a kinematic viscosity at 40° C. of between 20 and 450 $mm^2/s$.

* * * * *